US008320240B2

United States Patent
Kwan et al.

(10) Patent No.: US 8,320,240 B2
(45) Date of Patent: *Nov. 27, 2012

(54) RATE LIMITING AND MINIMUM AND MAXIMUM SHAPING IN A NETWORK DEVICE

(75) Inventors: Bruce H. Kwan, Sunnyvale, CA (US); Chien-Hsien Wu, Cupertino, CA (US)

(73) Assignee: Broadcom Corporation, Irvine, CA (US)

( * ) Notice: Subject to any disclaimer, the term of this patent is extended or adjusted under 35 U.S.C. 154(b) by 600 days.

This patent is subject to a terminal disclaimer.

(21) Appl. No.: 11/272,131

(22) Filed: Nov. 14, 2005

(65) Prior Publication Data

US 2006/0114912 A1    Jun. 1, 2006

Related U.S. Application Data (60) Provisional application No. 60/631,569, filed on Nov. 30, 2004.

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 12/28* | (2006.01) |
| *H04L 12/16* | (2006.01) |

(52) U.S. Cl. .................................. 370/229; 370/395.42
(58) Field of Classification Search .................. 370/229, 370/230, 230.1, 231, 232, 233, 234, 235, 370/235.1
See application file for complete search history.

(56) References Cited

U.S. PATENT DOCUMENTS

| | | | |
|---|---|---|---|
| 5,473,607 A | 12/1995 | Hausman et al. | ........... 370/85.13 |
| 5,761,424 A | 6/1998 | Adams et al. | ............. 395/200.47 |
| 5,887,187 A | 3/1999 | Rostoker et al. | ......... 595/800.29 |
| 5,898,689 A * | 4/1999 | Kumar et al. | .................. 370/232 |

(Continued)

FOREIGN PATENT DOCUMENTS

EP    0 312 917 A2    4/1989

(Continued)

OTHER PUBLICATIONS

Fair and Efficient Packet Scheduling using Elastic Round Robin, Salil Kanhere, Harish Sethu and Alpa Parekh, IEEE Transactions on Parallel and Distributed Systems, vol. 13, No. 3, Mar. 2002, pp. 324-336.*

(Continued)

*Primary Examiner* — John Blanton
*Assistant Examiner* — Christopher Crutchfield (57) ABSTRACT

A network device for scheduling packets in a plurality of queues includes a plurality of leaky bucket modules, each of the plurality of leaky bucket mechanisms being associated with one of a plurality of queues and configured to process information based on a predefined bandwidth, a scheduler configured to schedule services of the plurality of queues and a metering module for tracking whether or not the plurality of queues has exceeded a predefined threshold through the leaky bucket modules. If the plurality of queues has exceeded the predefined threshold, the metering module is configured to compute a new bandwidth allocation for each of the plurality of queues, the new bandwidth allocation replacing the predefined bandwidth and being proportional to the predefined bandwidth for each of the plurality of queues.

20 Claims, 7 Drawing Sheets

U.S. PATENT DOCUMENTS

| | | | |
|---|---|---|---|
| 5,909,686 A | 6/1999 | Muller et al. | 707/104 |
| 6,052,379 A * | 4/2000 | Iverson et al. | 370/442 |
| 6,167,050 A * | 12/2000 | Chung | 370/235.1 |
| 6,205,118 B1 * | 3/2001 | Rathnavelu | 370/229 |
| 6,289,013 B1 | 9/2001 | Lakshman et al. | 370/389 |
| 6,335,935 B2 | 1/2002 | Kadambi et al. | 370/396 |
| 6,341,130 B1 | 1/2002 | Lakshman et al. | 370/389 |
| 6,469,982 B1 * | 10/2002 | Henrion et al. | 370/230 |
| 6,591,299 B2 | 7/2003 | Riddle et al. | 709/224 |
| 7,023,799 B2 * | 4/2006 | Takase et al. | 370/230.1 |
| 7,430,209 B2 * | 9/2008 | Porter | 370/395.4 |
| 7,474,668 B2 * | 1/2009 | Bauman et al. | 370/412 |
| 2004/0151184 A1 * | 8/2004 | Wang et al. | 370/395.2 |
| 2004/0213156 A1 * | 10/2004 | Smallwood et al. | 370/232 |
| 2005/0120102 A1 * | 6/2005 | Gandhi et al. | 709/223 |
| 2010/0220742 A1 * | 9/2010 | Brewer et al. | 370/412 |

FOREIGN PATENT DOCUMENTS

| | | |
|---|---|---|
| WO | WO 99/00936 | 1/1999 |
| WO | WO 99/00944 | 1/1999 |

OTHER PUBLICATIONS

Author Unknown, MPLS Traffic Policy Classification, as indexed by the internet archive on Nov. 1, 2004, pp. 1-7.*

Kim, Chul, "MPLS Module—Interface Module Description", NIST Home, Modeling Specification, Dec. 26, 2002, pp. 1-9.

* cited by examiner

RATE LIMITING AND MINIMUM AND MAXIMUM SHAPING IN A NETWORK DEVICE

CROSS-REFERENCE TO RELATED APPLICATIONS

This application claims priority of U.S. Provisional Patent Application Ser. No. 60/631,569, filed on Nov. 30, 2004. The subject matter of this earlier filed application is hereby incorporated by reference.

BACKGROUND OF THE INVENTION

1. Field of the Invention

The present invention relates to a network device in a data network and more particularly to metering and shaping traffic through a network device.

2. Description of the Related Art

A packet switched network may include one or more network devices, such as a Ethernet switching chip, each of which includes several modules that are used to process information that is transmitted through the device. Specifically, the device includes an ingress module, a Memory Management Unit (MMU) and an egress module. The ingress module includes switching functionality for determining to which destination port a packet should be directed. The MMU is used for storing packet information and performing resource checks. The egress module is used for performing packet modification and for transmitting the packet to at least one appropriate destination port. One of the ports on the device may be a CPU port that enables the device to send and receive information to and from external switching/routing control entities or CPUs.

Network devices often have to monitor the flow of traffic through the network device to determine whether there are points of congestion. The traffic through the device may have specific priorities, such as class-of-service (CoS) or Quality-of-Service (QoS), and the monitoring of traffic may be useful in making sure that those priorities are preserved. In addition to monitoring, the traffic through the network device can also be shaped to meet specific requirements. The shaping allows for the network device to accommodate minimum, maximum and bursty requirements.

However, as the clock speed of a network device increases, the metering and shaping of traffic must also increase to meet the increased speed requirements. As such, the methods of the prior art network devices to perform metering and shaping may not allow for proper functioning at high data rates. Thus, there is a need for metering and shaping methods that are applicable to network devices that handle multiple types of traffic.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein:

FIG. 7 illustrates leaky bucket processes of metering, with FIG. 7a illustrating the minimum rate metering operations and with FIG. 7b illustrating the maximum rate metering operations, according to one embodiment of the present invention.

DETAILED DESCRIPTION OF PREFERRED EMBODIMENTS

Reference will now be made to the preferred embodiments of the present invention, examples of which are illustrated in the accompanying drawings.

Figure 1:
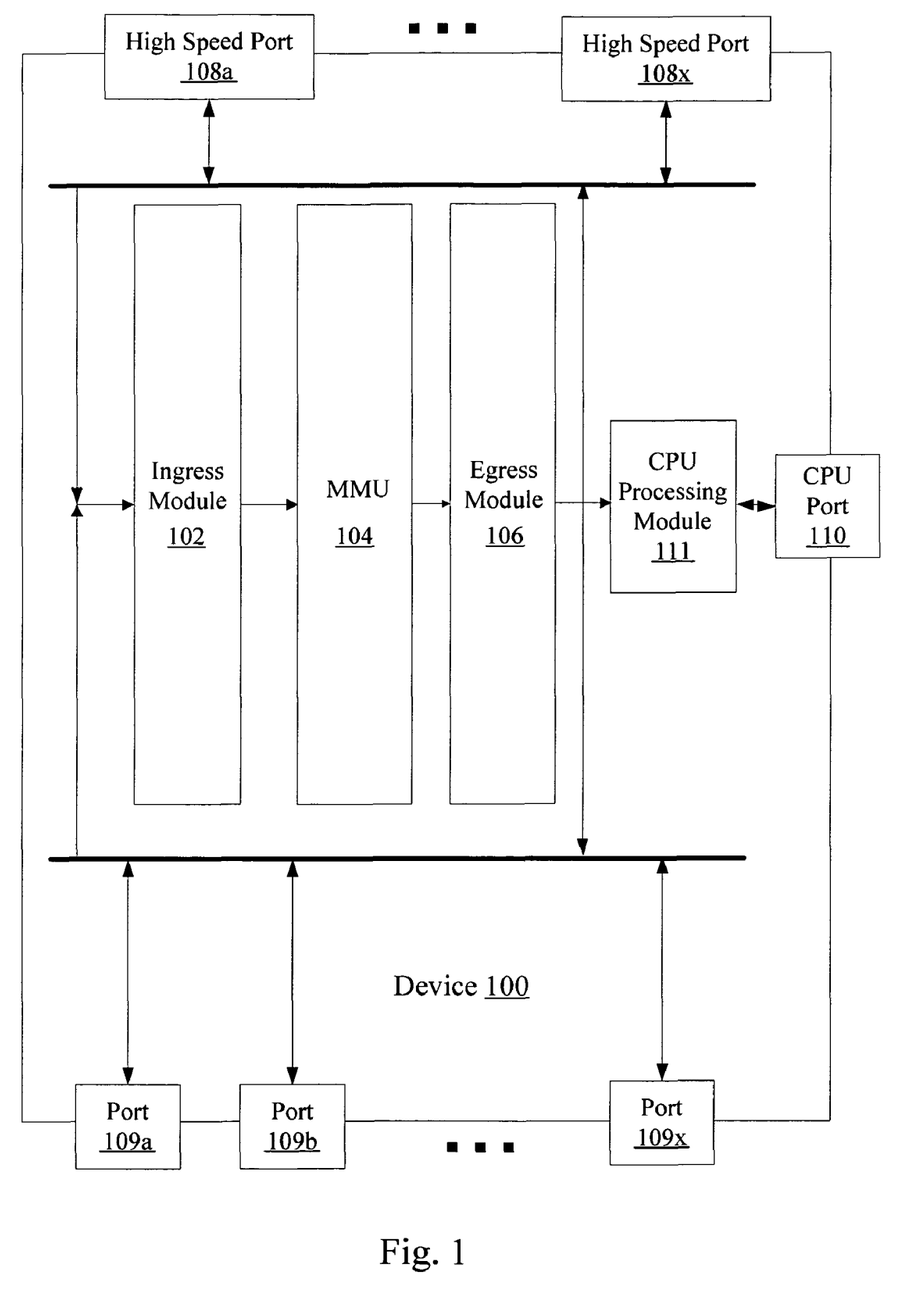
FIG. 1 illustrates a network device in which an embodiment of the present invention may be implemented.

FIG. 1 illustrates a network device, such as a switch, in which an embodiment the present invention may be implemented. Device 100 includes an ingress module 102, a MMU 104, and an egress module 106. Ingress module 102 is used for performing switching functionality on an incoming packet. MMU 104 is used for storing packets and performing resource checks on each packet. Egress module 106 is used for performing packet modification and transmitting the packet to an appropriate destination port. Each of ingress module 102, MMU 104 and Egress module 106 includes multiple cycles for processing instructions generated by that module. Device 100 implements a pipelined approach to process incoming packets. The device 100 has the ability of the pipeline to process, according to one embodiment, one packet every clock cycle. According to one embodiment of the invention, the device 100 includes a high-speed core clock and the architecture is capable of processing hundreds of million packets/sec.

Device 100 may also include one or more internal fabric high speed ports, 108a-108x, for example HiGig™ or high speed ports, one or more external Ethernet ports 109a-109x, and a CPU port 110. High speed ports 108a-108x are used to interconnect various network devices in a system and thus form an internal switching fabric for transporting packets between external source ports and one or more external destination ports. As such, high speed ports 108a-108x are not externally visible outside of a system that includes multiple interconnected network devices. CPU port 110 is used to send and receive packets to and from external switching/routing control entities or CPUs. According to an embodiment of the invention, CPU port 110 may be considered as one of external Ethernet ports 109a-109x. Device 100 interfaces with external/off-chip CPUs through a CPU processing module 111, such as a CMIC, which interfaces with a PCI bus that connects device 100 to an external CPU.

Network traffic enters and exits device 100 through external Ethernet ports 109a-109x. Specifically, traffic in device 100 is routed from an external Ethernet source port to one or more unique destination Ethernet ports 109a-109x. In one embodiment of the invention, device 100 supports physical Ethernet ports and logical (trunk) ports. A physical Ethernet port is a physical port on device 100 that is globally identified by a global port identifier. In an embodiment, the global port identifier includes a module identifier and a local port number that uniquely identifies device 100 and a specific physical port. The trunk ports are a set of physical external Ethernet ports that act as a single link layer port. Each trunk port is assigned a global a trunk group identifier (TGID). According to an embodiment, device 100 can support up to 128 trunk ports, with up to 8 members per trunk port, and up to 29 external physical ports. Destination ports 109a-109x on device 100 may be physical external Ethernet ports or trunk ports. If a destination port is a trunk port, device 100 dynamically selects a physical external Ethernet port in the trunk by using a hash to select a member port. The dynamic selection enables device 100 to allow for dynamic load sharing between ports in a trunk.

Once a packet enters device 100 on a source port 109a-109x, the packet is transmitted to ingress module 102 for processing. Packets may enter device 100 from a XBOD or a GBOD. The XBOD is a block that has one 10GE/12G MAC and supports packets from high speed ports 108a-108x. The GBOD is a block that has 12 10/100/1G MAC and supports packets from ports 109a-109x.

Figure 2:
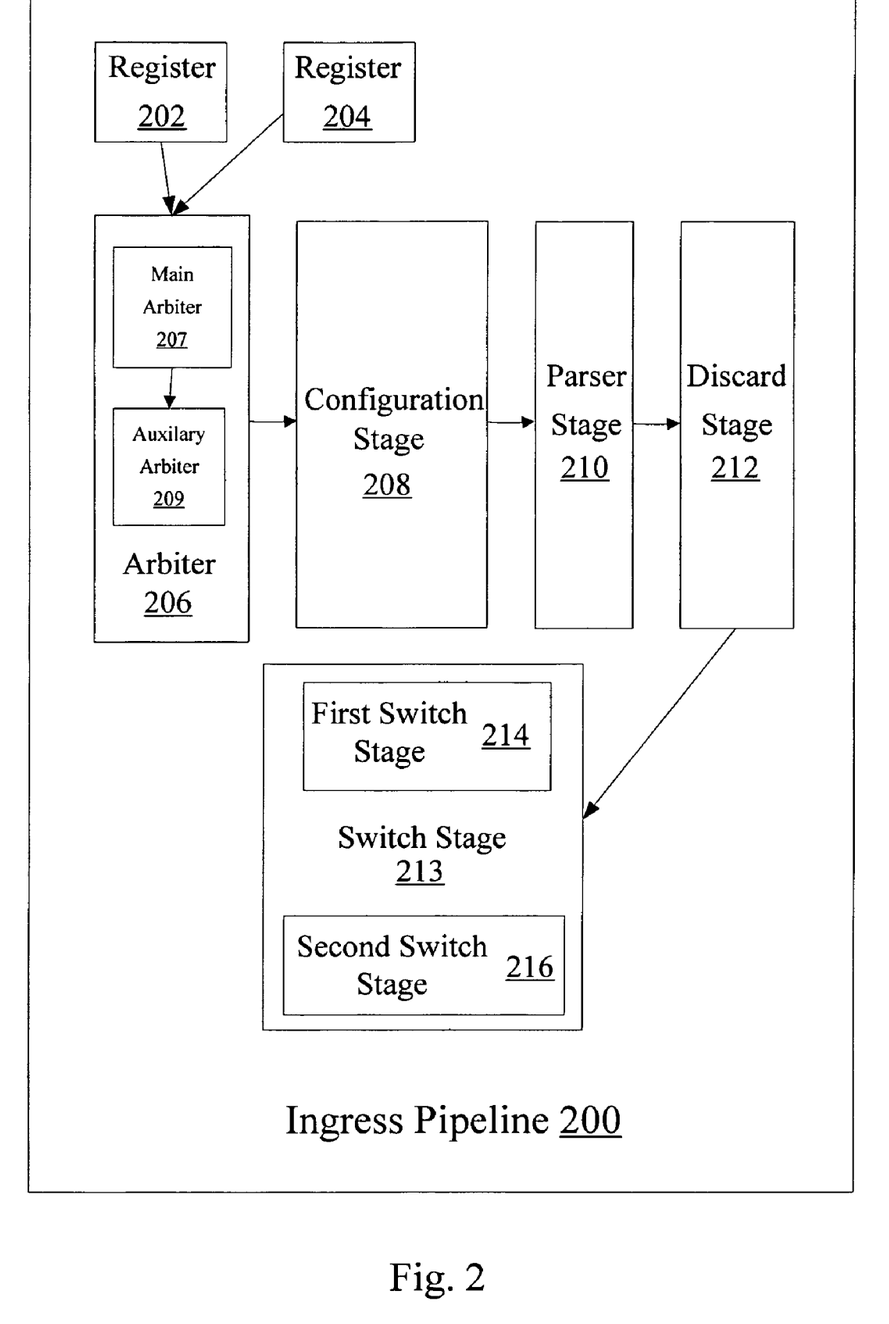
FIG. 2 illustrates a centralized ingress pipeline architecture, according to one embodiment of the present invention.

FIG. 2 illustrates a centralized ingress pipeline architecture 200 of ingress module 102. Ingress pipeline 200 processes incoming packets, primarily determines an egress bitmap and, in some cases, figures out which parts of the packet may be modified. Ingress pipeline 200 includes a data holding register 202, a module header holding register 204, an arbiter 206, a configuration stage 208, a parser stage 210, a discard stage 212 and a switch stage 213. Ingress pipeline 200 receives data from the XBOD, GBOD or CPU processing module 111 and stores cell data in data holding register 202. Arbiter 206 is responsible for scheduling requests from the GBOD, the XBOD and CPU. Configuration stage 208 is used for setting up a table with all major port-specific fields that are required for switching. Parser stage 210 parses the incoming packet and a high speed module header, if present, handles tunnelled packets through Layer 3 (L3) tunnel table lookups, generates user defined fields, verifies Internet Protocol version 4 (IPv4) checksum on outer IPv4 header, performs address checks and prepares relevant fields for downstream lookup processing. Discard stage 212 looks for various early discard conditions and either drops the packet and/or prevents it from being sent through pipeline 200. Switching stage 213 performs all switch processing in ingress pipeline 200, including address resolution.

According to one embodiment of the invention, the ingress pipeline includes one 1024-bit cell data holding register 202 and one 96-bit module header register 204 for each XBOD or GBOD. Data holding register 202 accumulates the incoming data into one contiguous 128-byte cell prior to arbitration and the module header register 204 stores an incoming 96-bit module header for use later in ingress pipeline 200. Specifically, holding register 202 stores incoming status information, including a Start cell Of Packet (SOP) signal, an End cell Of Packet (EOP) field, a purge field for indicating that the packet should be purged, a statistic update field for indicating that statistic counters should be updated for a particular packet, a high speed field for indicating that the associated packet arrived at a high speed port, a pause packet field for indicating if a current high speed packet is a pause packet, a cell byte count field for indicating the total bytes accumulated for the cell and a source port field. As is apparent to one skilled in the art, holding register 202 may store other fields not specifically identified above.

Ingress pipeline 200 schedules requests from the XBOD and GBOD every six clock cycles and sends a signal to each XBOD and GBOD to indicate when the requests from the XBOD and GBOD will be scheduled. CPU processing module 111 transfers one cell at a time to ingress module 102 and waits for an indication that ingress module 102 has used the cell before sending subsequent cells. Ingress pipeline 200 multiplexes signals from each of XBOD, GBOD and CPU processing based on which source is granted access to ingress pipeline 200 by arbiter 206. Upon receiving signals from the XBOD or GBOD, a source port is calculated by register buffer 202, the XBOD or GBOD connection is mapped to a particular physical port number on device 100 and register 202 passes information relating to a scheduled cell to arbiter 206.

When arbiter 206 receives information from register buffer 202, arbiter 206 may issue at least one of a packet operation code, an instruction operation code or a FP refresh code, depending on resource conflicts. According to one embodiment, the arbiter 206 includes a main arbiter 207 and auxiliary arbiter 209. The main arbiter 207 is a time-division multiplex (TDM) based arbiter that is responsible for scheduling requests from the GBOD and the XBOD, wherein requests from main arbiter 207 are given the highest priority. The auxiliary arbiter 209 schedules all non XBOD/GBOD requests, including CPU packet access requests, CPU memory/register read/write requests, learn operations, age operations, CPU table insert/delete requests, refresh requests and rate-limit counter refresh request and auxiliary arbiter's 209 requests are scheduled based on available slots from main arbiter 207.

When the main arbiter 207 grants an XBOD or GBOD a slot, the cell data is pulled out of register 202 and sent, along with other information from register 202, down ingress pipeline 200. The XBOD/GBOD provides certain status bits, for example SOP, EOP and MOP status bits, to main arbiter 207 that it uses to schedule the XBOD/GBOD requests and resolve any arbitration conflicts with auxiliary arbiter 209. After scheduling the XBOD/GBOD cell, main arbiter 207 forwards certain status bits, for example SOP, EOP and MOP status bits, to auxiliary arbiter 209.

The auxiliary arbiter 209 is also responsible for performing all resource checks, in a specific cycle, to ensure that any operations that are issued simultaneously do not access the same resources. As such, auxiliary arbiter 209 is capable of scheduling a maximum of one instruction operation code or packet operation code per request cycle. According to one embodiment, auxiliary arbiter 209 implements resource check processing and a strict priority arbitration scheme. The resource check processing looks at all possible pending requests to determine which requests can be sent based on the resources that they use. Resources of ingress pipeline 200 are separated into lookup resources for SOP cells, MMU access for all cells, EOP resources for EOP cells and L2_MOD_FIFO resource for Layer 2 (L2) operations. The L2_MOD_FIFO resource is a 16 entry table that is used for tracking all updates to a Layer 2 (L2) table. Since the L2_MOD_FIFO resource is limited, auxiliary arbiter 209 restricts certain operations once the L2_MOD_FIFO resource is full. Additionally, auxiliary arbiter 209 may not schedule access to any address resolution processing faster than once every three clock cycles.

The strict priority arbitration scheme implemented in an embodiment of the invention requires that CPU access request are given the highest priority, CPU packet transfer requests are given the second highest priority, rate refresh request are given the third highest priority, CPU memory reset operations are given the fourth highest priority and Learn and age operations are given the fifth highest priority by auxiliary arbiter 209. Upon processing the cell data, auxiliary arbiter 209 transmits packet signals, including SOP and EOP, the 1024 bit packet cell data, a L2_MOD_FIFO lock bit, instruction operation code information and instruction write data to configuration stage 208. As is apparent to one skilled in the art, the arbiter may transmit other types and/or configurations of information to configuration stage 208.

Configuration stage 208 includes a port table for holding all major port specific fields that are required for switching, wherein one entry is associated with each port. The configuration stage 208 also includes several registers. When the configuration stage 208 obtains information from arbiter 206, the configuration stage 208 sets up the inputs for the port table during a first cycle and multiplexes outputs for other port specific registers during a second cycle. At the end of the second cycle, configuration stage 208 sends output, including SOP, EOP, MOP, PURGE and statistic update, to parser stage 210.

Parser stage 210 manages an ingress pipeline buffer which holds the 128-byte cell as lookup requests traverse pipeline 200. When the lookup request reaches the end of pipeline 200, the data is pulled from the ingress pipeline buffer and sent to MMU 104. If the packet is received on a high speed port, a 96-bit module header accompanying the packet is parsed by parser stage 210.

Figure 3:
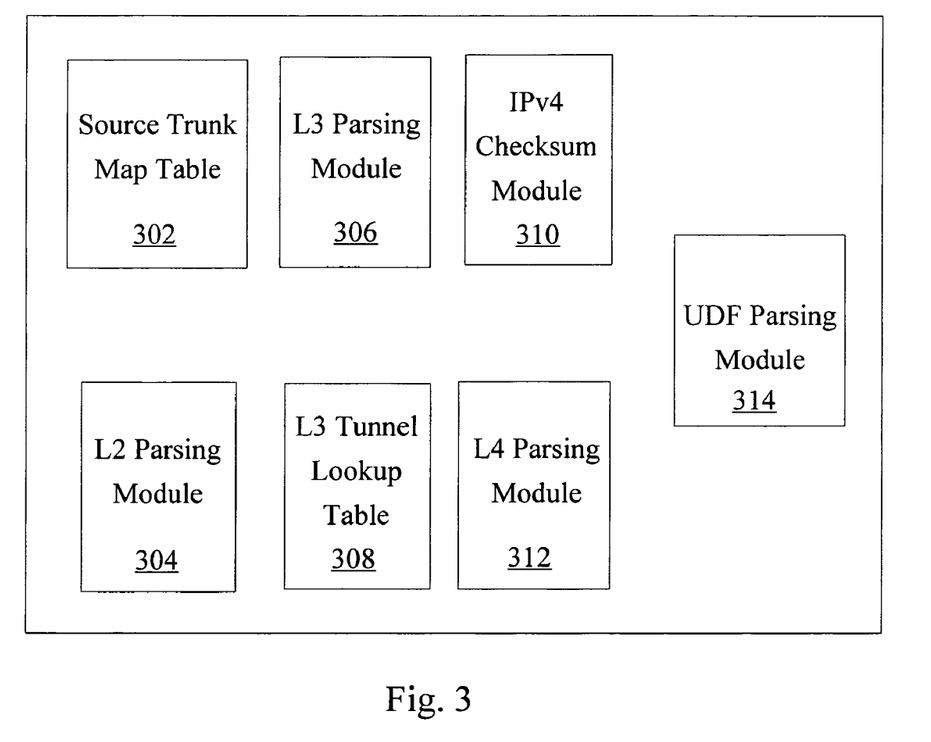
FIG. 3 illustrates the components of the parser stage, according to one embodiment of the present invention.

FIG. 3 illustrates the components of parser stage 210. According to FIG. 3, parser stage 210 includes a source trunk map table 302, a L2 parsing module 304, Layer 3 (L3) parsing module 306, L3 Tunnel lookup module 308, IPv4 checksum module 310, Layer 4 (L4) parsing module 312 and user defined field (UDF) parsing module 314. The source trunk map table 302 is used by parser stage 210 for source trunk resolution. L2 parsing module 304 supports parsing of different types of layer 2 encapsulations, including Ethernet II, 802.3, SNAP and 802.3 LLC packet types. L3 parsing module 306 supports parsing of different types of L3 encapsulations, including IPv4 packets with or without options, IPv6 packets and ARP packets. Additionally, L3 parsing module 306 supports parsing tunnelled packet to enable IP-in-IP and IPv6 over IPv4 tunnelling. L3 tunnel lookup module 308 includes a 128 entry TCAM L3 tunnel table to enable parser 212 to determine if the incoming packet is a tunnelled IPv4 packet. IPv4 checksum module 310 verifies the IPv4 checksum on the outer IPv4 header and checks the IPv4 checksum on an outer IPv4 header with or without options. L4 parsing module 312 supports L4 parsing and UDF parsing module 314 supports user defined fields parsing for allowing users to match on arbitrary fields within the first 128 bytes of the packet.

After all fields have been parsed, parser stage 210 writes the incoming cell data to the ingress pipeline buffer and passes a write pointer down the pipeline. Since the packet data is written to the ingress pipeline buffer, the packet data need not be transmitted further and the parsed module header information may be dropped. Discard stage 212 then looks for various early discard conditions and drops the packet and/or prevents it from being sent through the chip.

Switching stage 213 performs address resolution processing and other switching on incoming packets. According to an embodiment of the invention, switching stage 213 includes a first switch stage 214 and a second switch stage 216. First switch stage 214 resolves any drop conditions, performs BPDU processing, checks for L2 source station movement and resolves most of the destination processing for L2 and L3 unicast packets, L3 multicast packets and IPMC packets. The first switch stage 214 also performs protocol packet control switching by optionally copying different types of protocol packets to the CPU or dropping them. The first switch stage 214 further performs all source address checks and determines if the L2 entry needs to get learned or re-learned for station movement cases. The first switch stage 214 further performs destination calls to determine how to switch packet based on a destination switching information. Specifically, the first switch stage 214 figures out the destination port for unicast packets or port bitmap of multicast packets, calculates a new priority, optionally traps packets to the CPU and drops packets for various error conditions. The first switch stage 214 also includes a DSCP_Table for mapping an incoming IPv4 or IPv6 DSCP to a new value. The first switch stage 214 further includes rate limiting counters that provide the ability to program specific rates for multicast, broadcast and DLF traffic. The first switch stage 214 handles high speed switch processing separate from switch processing from port 109a-109x and switches the incoming high speed packet based on the stage header operation code.

The second switch stage 216 then performs FP action resolution, source port removal, trunk resolution, high speed trunking, port blocking, CPU priority processing, end-to-end Head of Line (HOL) resource check, resource check, mirroring, maximum transfer length (MTU) checks for verifying that the size of incoming/outgoing packets is below a maximum transfer length. The second switch stage 216 takes first switch stage 216 switching decision, any L3 routing information and FP redirection to produce a final destination for switching. The second switch stage 216 also removes the source port from the destination port bitmap and performs trunk resolution processing for resolving the trunking for the destination port for unicast packets, the ingress mirror-to-port and the egress mirror-to-port. The second switch stage 216 also performs high speed trunking by checking if the source port is part of a high speed trunk group and, if it is, removing all ports of the source high speed trunk group. The second switch stage 216 further performs port blocking by performing masking for a variety of reasons, including meshing and egress masking. The second switch stage 216 also determines priority/Class of Service for packets that are being sent to the CPU. The second switch stage 216 further performs resource checks before mirroring to generate an accurate port bitmap for egress mirroring and to remove any resource-limited ports that might have been added by mirroring. The second switch stage 216 then outputs the p-bus fields and the cell data to MMU 104. The p-bus fields indicate to egress stage 106 how to switch and modify the packet.

Upon receiving the packet from MMU 104, egress module 106 supports multiple egress functions for a 72 gigabyte port bandwidth and a CPU processing bandwidth. According to one embodiment, the egress module 106 is capable of handling more than 72 Gig of traffic, i.e., 24 one GE port, 4 high speed ports (12G) and a CPU processing port of 0.2GE. The egress module 106 receives original packets, as inputted from Ethernet ports 109a-109x, from MMU 104, and may either transmit modified or unmodified packets to destination ports 109a-109x. According to one embodiment of the invention, all packet modifications within device 100 are made in egress module 106 and the core processing of egress module 106 is capable of running faster than the processing of destination ports 109a-109x. Therefore, egress module 106 provides a stall mechanism on a port basis to prevent ports 109a-109x from becoming overloaded and thus services each port based on the speed of the port.

In an embodiment of the invention, the egress module 106 is connected to the MMU 104 by a 1024 bits data interface and all packets transmitted from the MMU 104 passes through egress module 106. Specifically, the MMI 104 passes unmodified packet data and control information to egress module 106. The control information includes the results of table lookups and switching decisions made in ingress module 102. The data bus from MMU 106 is shared across all ports 108 and 109 and the CPU processing 111. As such, the bus uses a "request based" Time Division Multiplexing (TDM) scheme, wherein each Gig port has a turn on the bus every 72 cycles and each high speed Port 108 has a turn every 6 cycles. CPU processing packet data is transmitted over bubbles—free spaces occurring on the bus. Upon receiving the information for the MMU 104, the egress module 106 parses the packet data, performs table lookups, executes switch logic, modifies, aligns and further buffers the packet before the data is transmitted to the appropriate destination port 109a-109x.

The egress module 106 is connected to the CPU processing module 111 through a 32 bit S-bus interface which the CPU uses to send requests to egress module 106. The requests are typically for reading the egress module's resources, i.e., registers, memories and/or stat counters. Upon receiving a request, the egress module 106 converts the request into a command and uses a mechanism, described in detail below, for storing and inserting CPU instructions into a pipeline wherever there is an available slot on the pipeline.

Figure 4:
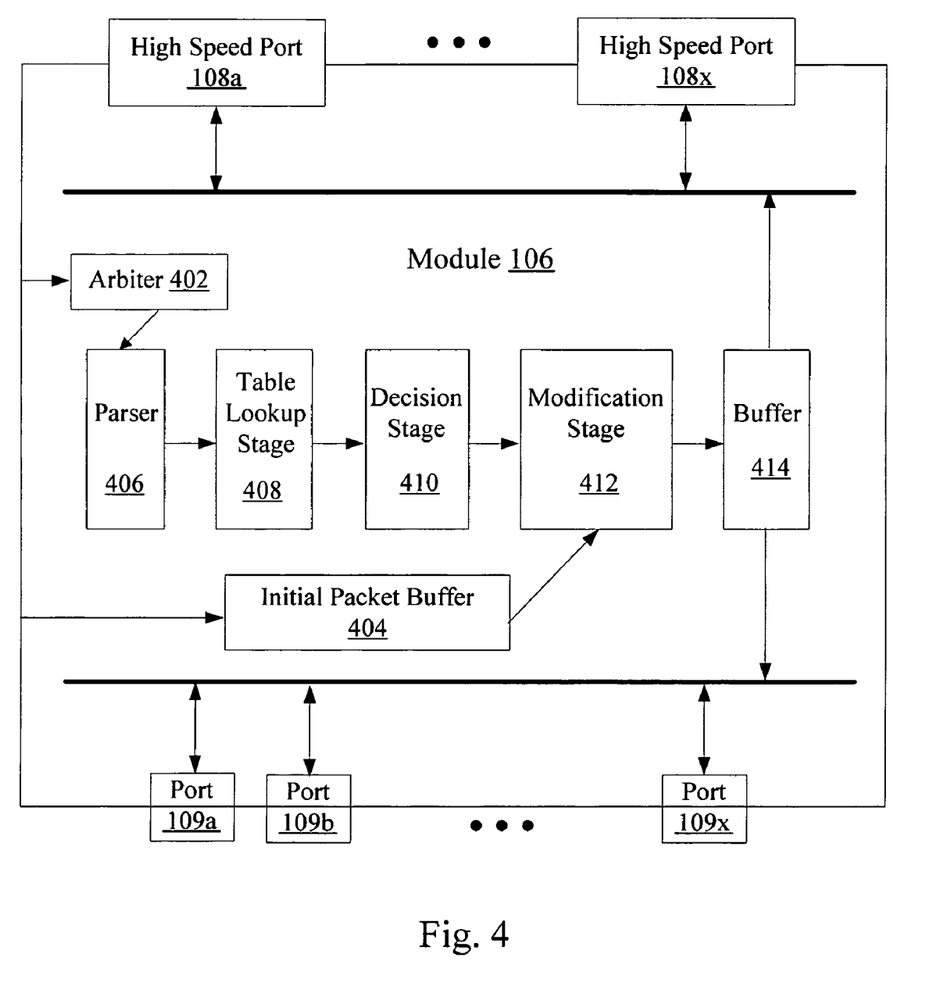
FIG. 4 illustrates a centralized egress pipeline architecture of an egress stage, according to one embodiment of the present invention.

FIG. 4 illustrates a centralized egress pipeline architecture of egress stage 106. The egress pipeline includes an arbiter 402, parser 406, a table lookup stage 408, a decision stage 410, a modification stage 412 and a data buffer 414. The arbiter 402 provides arbitration for accessing egress pipeline resources between packet data and control information from MMU and information from the CPU. Parser 406 performs packet parsing for table lookups and modifications. Table lookup stage 408 performs table lookups for information transmitted from parser 406. Decision stage 410 is used for deciding whether to modify, drop or otherwise process the packet. Modification stage 412 makes modification to the packet data based on outputs from previous stages of the ingress module.

All incoming packet data from the MMU 104 is transmitted to an initial packet buffer 404. In an embodiment of the invention, the initial packet buffer is 1044 bits wide and 18 words deep. The egress pipeline receives two inputs, packet data and control information from the MMU 104 and CPU operations from the s-bus. The initial packet buffer 404 stores packet data and keeps track of any empty cycles coming from MMU 104. Initial packet buffer 404 outputs its write address and parser 406 passes the latest write address with pipeline instructions to modification stage 414.

The arbiter 402 collects packet data and control information from the MMU 104 and read/write requests to registers and memories from the CPU and synchronizes the packet data and control information from MMU 104 and writes the requests from the CPU in a holding register. Based on the request type from the CPU, the arbiter 402 generates pipeline register and memory access instructions and hardware table initialization instructions. After arbiter 402 collects packet data, CPU requests and hardware table initialization messages, it generates an appropriate instruction. According to an embodiment, arbiter 402 generates a Start Cell Packet instruction, an End Cell of Packet instruction, a Middle Cell of Packet instruction, a Start-End Cell of Packet instruction, a Register Read Operation instruction, a Register Write Operation instruction, Memory Read Operation instruction, a Memory Write Operation instruction, a Memory Reset Write Operation instruction, a Memory Reset Write All Operation instruction and a No Operation instruction. Egress pipeline resources associated Start Cell Packet instructions and Start-End Cell of Packet instructions are given the highest priority by arbiter 404. End Cell of Packet instructions, Middle Cell of Packet instructions, Register Read Operation instructions, Register Write Operation instructions, Memory Read Operation instructions and Memory Write Operation instruction receive the second highest priority from arbiter 404. Memory Reset Write Operation instructions and Memory Reset Write All Operation instructions receive the third highest priority from arbiter 404. No Operation instructions receive the lowest priority from arbiter 404.

After receiving an instruction from arbiter 404, parser 406 parses packet data associated with the Start Cell of Packet instruction and the Start-End Cell of Packet instruction using the control information and a configuration register transmitted from arbiter 406. According to an embodiment, the packet data is parsed to obtained L4 and L3 fields which appear in the first 148 bytes of the packet.

Figure 5:
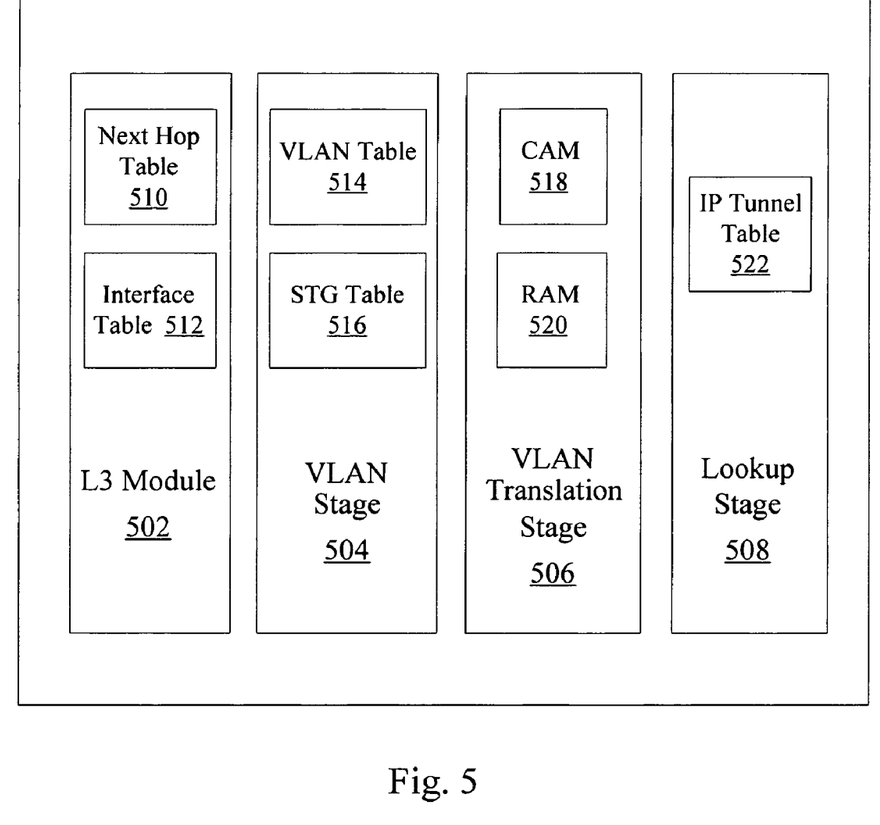
FIG. 5 illustrates an embodiment of a table lookup stage, according to one embodiment of the present invention.

Table lookup stage 408 then receives all packet fields and register values from parser 406. FIG. 5 further illustrates table lookup stage 408. Table lookup stage 408 includes a L3 Module 502, a VLAN stage 504, a VLAN translation stage 506, IP tunneling lookup stage 508. In an embodiment of the invention, L3 Module 502 includes a 8k deep Next Hop Table 510 and a 4K deep Interface table 512. Next Hop table 510 is indexed based on a 13 bit wide next hop index from the MMU 104 and Next Hop table 510 provides a MAC Address and an Interface Number that is used, depending on the type of packet, to index Interface table 512. For all Memory Read Operation and Memory Write Operation instructions, table lookup stage 408 decodes the address and writes or reads data from corresponding tables.

VLAN stage 504 is used to obtain VLAN related information and a spanning tree state of an outgoing port. VLAN stage 504 includes a VLAN table 514 and a stage (STG) table 516. VLAN table 514 is indexed based on the VLAN IDs from either the packet or Interface table 512. If a VLAN table lookup results in a "miss", i.e., an invalid VLAN, then the packet may be dropped. If the VLAN entry is valid but the outgoing port is not a member of the VLAN, then the packet may be also dropped. The VLAN table outputs a VLAN membership, untagged bitmap, and a STG group number which is used to index STG table 516. STG table 516 outputs an STG vector which contains the spanning tree state of the outgoing ports. VLAN stage 504 also determines whether the packet should be modified in egress pipeline for CPU and ingress mirroring cases.

VLAN translation stage 506 translates the incoming VLAN to a new one and searches various tables. VLAN translation stage 506 includes a Content Addressable Memory (CAM) 518 and an associated Data Random Addressable Memory (RAM) 520. CAM 518 is searched with the VLAN ID and the destination port number and if an associated entry is found, an address is obtained from CAM 518 to access the associated Data RAM 520.

IP tunneling lookup stage 508 obtains a partial Tunnel IP header from appropriate tables, registers and parsed packet fields. IP tunnelling lookup stage 508 includes a IP tunnel table 522 that is indexed issuing a tunnel index from interface table 512 and outputs tunnel type, among other information, which is used to distinguish among tunnel protocols that are implemented in egress pipeline.

Information from table lookup stage 406 is then transmitted to decision stage 410 where a decision is made as to whether to modify, drop or otherwise process the packet. For example, decision stage 410 first looks for flush bits at the beginning of the packet transmission and if the flush bits are set, the packets are marked "dropped". In an embodiment of the invention, if a flush bit for a packet is set for a packet already in transmission, the packet is completely transmitted and the next packet is flushed. In another example, MMU 104 may mark packets as Purge, Aged or Cell Error and decision stage 410 may either be dropped or transmit these packet but mark them as erroneous. In another example, if a VLAN translate feature is enabled, but there was a miss in CAM 518 lookup, the decision stage 410 may drop the packet if certain fields are set. Decision stage 408 also determines if the packet need to be L4 switched or L3 routed and the type of mirroring functions that need to be performed on the packet.

Modification stage 412 thereafter constructs a Tunnel IP Header and a module header for the packet, makes replacement changes in the packet and computes IP checksum for outer and inner IP headers. Modification stage 412 receives a packet data interface from the initial buffer 404 which enables modification stage 401 to provide a read address to initial buffer 404 and in response obtain the packet data and basic control data. Modification stage 412 then generates Middle of Packet and End of Packet instructions based on the data received from initial buffer 404 and makes changes based on these commands. Modification stage 412 also receives all packet decisions and pipeline commands decision stage 410 and uses this information to make further changes to the packet. Specifically, all fields of the tunnel IP header which need to be filled by incoming packet fields are filled.

Furthermore, IP checksum for tunnel IP header is computed in parallel with the header construction. Modification stage 412 further reads back packets and control information from initial buffer 404 and performs all packet modifications and replacements of fields. It outputs CPU operations and hardware commands and data and addresses associated with them on one bus and outputs packet data and control information on another bus. Additionally, modification stage 412 performs physical encapsulation and de-capsulation of headers and tag removal and insertions. If a packet is going to a high speed port, modification stage 412 converts the packet from Ethernet format to high speed format. Modification stage 412 also aligns the packet by padding packets smaller than 64 bytes and removes holes by aligning data to 1314 bit boundary. Thereafter, 1314 bits "complete" data word is outputted from modification stage 412 to the data buffer 414.

Data buffer 414 stores completed data words from modification stage 412 in memory. Before the egress pipeline sends packets out to destination ports 109a-109x, the packet data are stored in the data buffer 414 for pipeline latency and port speed matching. Data buffer 414 is capable for requesting data from MMU 104 whenever it has a free space.

Traffic shaping is a mechanism that alters traffic characteristics of a stream to achieve better network efficiency while meeting the Quality of Service (QoS) objectives or to ensure conformance at a subsequent interface. Traffic shaping should also allow for buffer latency to be insensitive to traffic to allow latency sensitive traffic to get though first. Traffic metering is a measurement mechanism that supports the differentiated services (DiffServ) traffic conditioning functionality (i.e. marks/polices packets). This aids in differentiated treatment of packets based on whether or not they are a part of a flow that is in or out of profile according to the pre-defined QoS objectives (i.e. Service Level Agreements (SLA's)).

Both traffic metering and shaping occur through the multiple portions of the network device, according to embodiments of the present invention. Some of the metering and shaping occurs through the filter processor and other portions occur through the MMU. The metering and shaping that occurs through the MMU works with traffic from the higher speed port and the 1 Gigabit Ethernet ports. The metering and shaping process in the filter processor utilizes a refresh count based on a token bucket and the refresh count for the MMU is based on a leaky bucket. In both, according to certain embodiments, the update interval is between 1-10 μs, with bucket depths dependent on traffic bursting range and accommodates bursts of up to a specific rate that depends on the traffic that could be allowed.

With respect to scheduling, many types of scheduling may be supported including strict priority, round robin, weighted round robin, deficit round robin (DRR), strict priority+ weighted round robin, and strict priority+deficit round robin. Through a combination of min/max metering and shaping and the general scheduler configuration, a wide variety of scheduling behavior may be configured. Per port maximum bandwidth rate limiting is also provided to limit the port rate.

Figure 6:
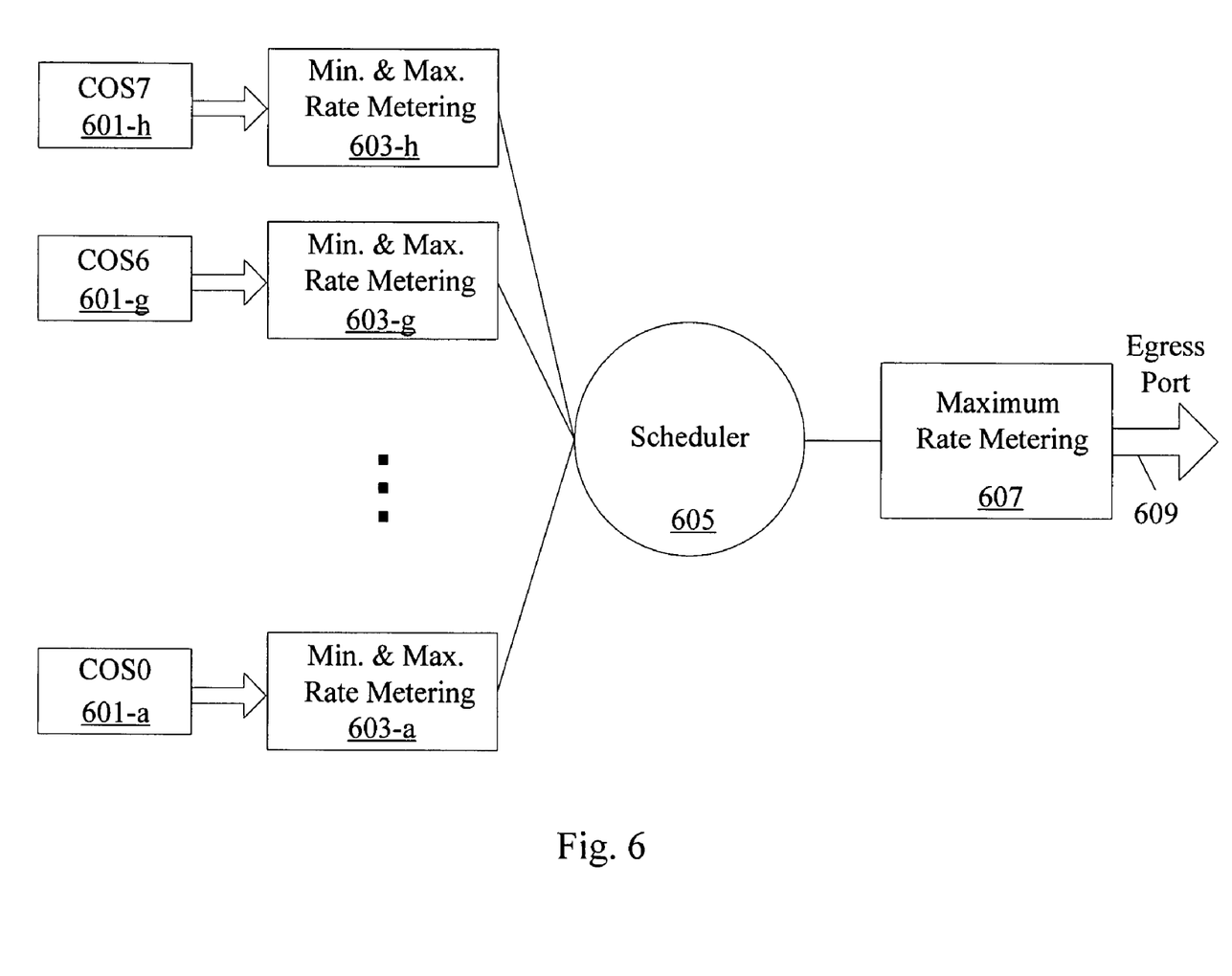
FIG. 6 illustrates a process of metering, shaping and scheduling of traffic in a network device, according to one embodiment of the present invention.

The scheduling order that is applied uses several variables which are affected the bandwidth used by a specific queue. Associated with each CoS queue is a minimum bandwidth requirement and a maximum bandwidth limit. Based on these specifications and the associated traffic meters per CoS queue, the state variables are updated. The boolean state variables include the following: MinSatisfied, MaxExceeded. Based on these variables, the set of CoS queues may be divided into two possible groups: MinBWGroup, ExcessBWGroup, and IdleGroup. The MinBWGroup is populated by COS queues that have MinSatisfied set to false. The ExcessBWGroup is populated by COS queues that have MinSatisfied set to true and MaxExceeded set to false. The IdleGroup is populated by COS queues that have both MinSatistied and MaxExceeded set to true. When all CoS queues are in the IdleGroup, no queues are serviced. This scheduling is illustrated in FIG. 6. The queues are separated by CoS, 601-*a* through 601-*h*, in the illustrated embodiment. Each CoS queue has a minimum and maximum rate metering module, 603-*a* through 603-*h*, that set the metering and shaping behaviour, as discussed below. Each module feeds into a scheduler, 605, which is discussed in more detail below. The output of the scheduler also passes through both a maximum and a minimum rate metering module 607 to monitor and shape the maximum flow for all of the queues. Thereafter, the scheduled traffic is sent to the egress port 609. Specific scheduling processes are discussed below.

The maximum and minimum rate metering module 607 includes a refresh count register for refresh count for egress port level max bandwidth leaky bucket, a threshold register for egress port level maximum bandwidth leaky bucket, a profile register for indicating a current state of egress bucket level maximum rate bucket (either out of profile, egress port max bw not exceeded, or in profile, egress port max bw exceeded), and a maximum rate bucket counter register.

With respect to a deficit round robin scheduling, relative bandwidth sharing is provided across all active CoS queues. DRR weights are set relative to each other. The weights can vary between predefined whole number values, with a basic quantum based on the MTU size. If minimum bandwidth is configured, this requirement will be met first. Ordering of how minimum bandwidth is distributed is influenced by DRR scheduler. Excess bandwidth is shared according to the DRR weights. This feature can also be disabled, according to some embodiments of the invention.

The key to Firebolt's DRR operation is that the credit counter is allowed to drop below 0. This "deficit" is then tracked so that in the subsequent scheduling rounds the queue will be given fewer credits. The minimum and maximum metering mechanisms may be used in conjunction with the DRR mode. This allows a user to specify a possibly equal distribution of bandwidth for the minimum bandwidth requirements and then a weighted distribution of bandwidth allocation when servicing bandwidth larger than the minimum allocation. Maximum bandwidth shaping could also be used to limit bandwidth allocated to a specific COS queue.

With respect to min/max bandwidth sharing, such scheduling provides a minimum bandwidth and a maximum bandwidth per CoS, where the minimum and maximum bandwidth settings are absolute. The scheduling order is based on Min-NotMet and MaxNotMet groups as specified earlier. When multiple CoS queues exist in a single group, packet round robin ordering is used.

With respect to scheduling using a strict priority with DRR, when using the DRR scheduler, if a set of queues are configured with a zero weight, those queues are serviced according to a strict priority. For example, CoS7 may receive up to 80% of the bandwidth (on a 1 Gbps link) before other queues are allowed access to the remaining bandwidth. The remaining bandwidth is distributed only when COS7 is empty (in this case when MinBW==0), in this example. Bandwidth not used by COS7 is distributed according to the relative DRR weights.

Similarly, with scheduling using strict priority with min/max bandwidth sharing, a minimum bandwidth and a maximum bandwidth per CoS are provided. Again, minimum and maximum bandwidth settings are absolute and a strict priority is used to service both the MinNotMet and MaxNotMet groups.

Figure 7A:
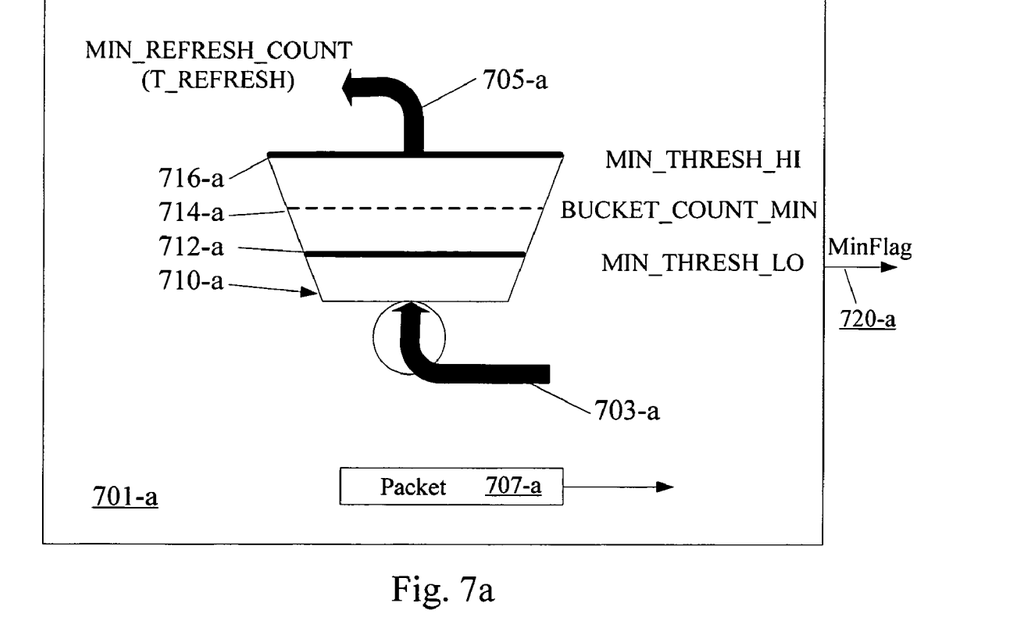

The minimum rate metering occurs on a per CoS queue basis and the maximum metering and shaping occurs on both a CoS queue and a per port basis. The minimum and maximum rate state variables are used by the scheduler. With respect to the minimum rate metering, rates of 64 kbps to 16 Gbps are supported, in predefined increments. The process 701-$a$ that employs a leaky bucket the is illustrated in FIG. 7$a$, with the bucket 710-$a$. The maximum burst sizes 716-$a$, i.e. MIN_THRESH_HI, are user dependent, with the MIN_THRESH_LO 712-$a$ having the same range. The BUCKET_COUNT_MIN is indicated by 714-$a$. The minimum rate flag 720-$a$ outputs a zero, when the BUCKET_COUNT_MIN<MIN_THRESH_LO and outputs a one, when BUCKET_COUNT_MIN>=MIN_THRESH_LO. MIN_REFRESH_COUNT tokens are removed from the leaky bucket every T_REFRESH time units 705-$a$. When packets are sent 707-$a$, an appropriate number of tokens are added to the leaky bucket 703-$a$. Through this process, the minimum rate metering occurs.

| Field | Size | Description |
| --- | --- | --- |
| MIN_REFRESH_COUNT | 18 | # of tokens added to the token bucket every T_REFRESH time units. Allows for 64 kbps-16 Gbps setting, 64 kbps increments. |
| MIN_THRESH_HI | 4 | Maximum burst size. 4k * 2 ^ N. N is 4 bits. |
| MIN_THRESH_LO* | 4 | Threshold used to determine if meter has satisfied the minimum bw requirements. 4k * 2 ^ N. N is bits. |
| BUCKET_COUNT_MIN | 29 | Count of tokens in bucket. |

*When set to 0, min rate metering is disabled.

Figure 7B:
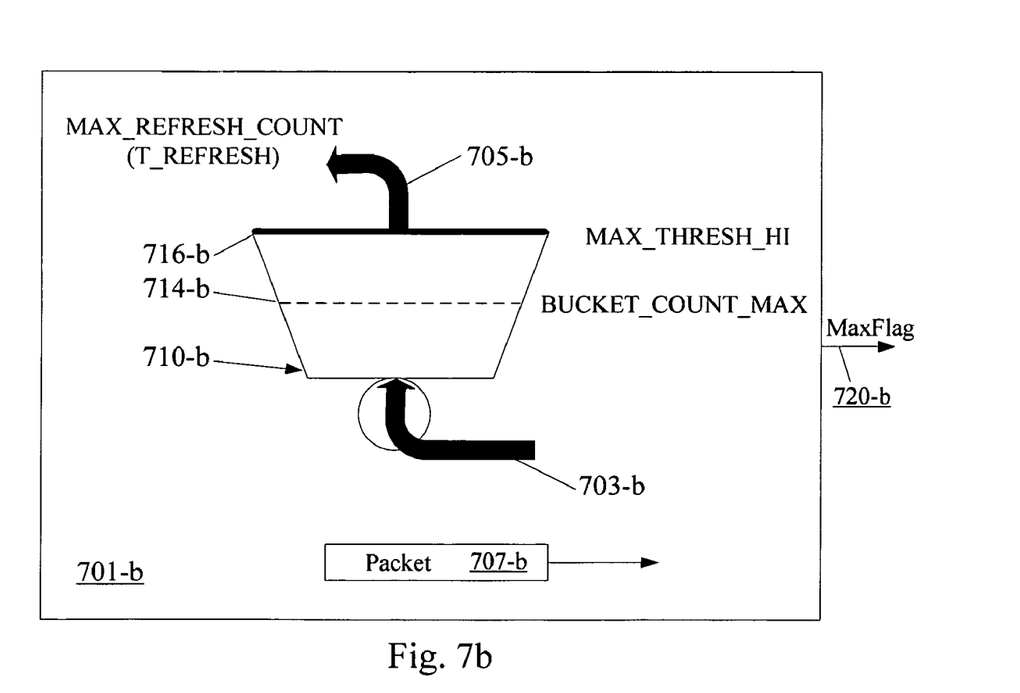

The process 701-$b$ that employs a leaky bucket the is illustrated in FIG. 7$b$, with the bucket 710-$b$. With respect to the minimum rate metering, rates of 64 kbps to 16 Gbps are supported, in 64 kbps increments. The maximum burst sizes are the same as for the minimum rate metering. The maximum rate flag 720-$b$ outputs a zero, when the BUCKET_COUNT_MAX<MIN_THRESH_HI and outputs a one, when BUCKET_COUNT_MAX>=MIN_THRESH_HI. MAX_REFRESH_COUNT 705-$b$ tokens are removed from the leaky bucket 710-$b$ every T_REFRESH time units. When packets are sent 707-$b$, the appropriate number of tokens are added to the leaky bucket 703-$b$. Through this process, the maximum rate metering occurs.

| Field | Size | Description |
| --- | --- | --- |
| MAX_REFRESH_COUNT | 18 | # of tokens added to the token bucket every T_REFRESH time units. Allows for 64 kbps-16 Gbps setting, 64 kbps increments. |
| MAX_THRESH_HI* | 4 | Maximum burst size. 4k * 2 ^ N. N is 4 bits. |
| BUCKET_COUNT_MAX | 29 | Count of tokens in bucket. |

*When set to 0, max rate metering is disabled.

Whenever all active queues have achieved minimum bandwidth (above MIN_THRESH_LO), a quantum of tokens are removed from each bucket. The quantum of tokens is computed by taking into account the MinBW settings and is normalized so as to avoid underflow on any of the leaky bucket mechanisms.

Timestamp mechanism only updates the token bucket every time a packet arrives on the interface rather than periodically. A timestamp used to compute the number of tokens that should have arrived between packet arrivals. Background process is run to deal with current time looping (i.e. adjustments made to TIMESTAMP).

current_tc=((current_time−TIMESTAMP)*RATE)+ TOKEN_COUNT new_tc=current_tc−packet_length The above-discussed configuration of the invention is, in a preferred embodiment, embodied on a semiconductor substrate, such as silicon, with appropriate semiconductor manufacturing techniques and based upon a circuit layout which would, based upon the embodiments discussed above, be apparent to those skilled in the art. A person of skill in the art with respect to semiconductor design and manufacturing would be able to implement the various modules, interfaces, and tables, buffers, etc. of the present invention onto a single semiconductor substrate, based upon the architectural description discussed above. It would also be within the scope of the invention to implement the disclosed elements of the invention in discrete electronic components, thereby taking advantage of the functional aspects of the invention without maximizing the advantages through the use of a single semiconductor substrate.

With respect to the present invention, network devices may be any device that utilizes network data, and can include switches, routers, bridges, gateways or servers. In addition, while the above discussion specifically mentions the handling of packets, packets, in the context of the instant application, can include any sort of datagrams, data packets and cells, or any type of data exchanged between network devices.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A network device for scheduling packets in a plurality of queues, the network device comprising:
a switch comprising:
a plurality of metering modules, each of the metering modules being associated with a queue and comprising:
a minimum threshold bucket module configured to indicate to the metering module whether a minimum bucket threshold is met based on comparing a minimum bucket count of the packets received by the associated queue to the minimum bucket threshold, the minimum bucket threshold being less than a minimum bucket high value and greater than a minimum bucket empty value for the minimum threshold bucket, the minimum bucket high value associated with the given queue determining a maximum burst size for the associated queue; and
a maximum threshold bucket module configured to indicate to the metering module whether a maximum bucket threshold is met based on comparing a maximum bucket count of the packets received by the associated queue to the maximum bucket threshold;
wherein each of the metering modules is configured to send, to a scheduler, a minimum bandwidth signal if the minimum bucket threshold is not met, an excess bandwidth signal if the minimum bucket threshold is met and the maximum bucket threshold is not met, and an idle signal if both the minimum bucket threshold is met and the maximum bucket threshold is met; and
the scheduler configured to allocate bandwidth for each of the plurality of queues first to the queues which are associated with metering modules that sent the minimum bandwidth signal and second to the queues which are associated with metering modules that sent the excess bandwidth signal, and to not service queues which are associated with metering modules that sent the idle signal.

2. The network device according to claim 1, wherein the minimum threshold bucket modules and maximum threshold bucket modules are configured to accept a number of tokens in proportion to a size of a packet being added to their associated queues.

3. The network device according to claim 1, wherein the minimum threshold bucket modules and maximum threshold bucket modules are configured to determine how many tokens to release at predetermined time intervals based on whether all of the plurality of queues have met their respective minimum bucket threshold.

4. The network device according to claim 1, wherein the scheduler is further configured to process latency sensitive traffic in the network device prior to processing latency insensitive traffic on a traffic burst basis.

5. The network device according to claim 1, further comprising the plurality of queues, each of the plurality of queues being coupled to its associated metering module, minimum threshold bucket module, maximum threshold bucket module, and to the scheduler.

6. The network device according to claim 1, wherein each of the minimum threshold bucket modules is configured to:
add tokens to the minimum bucket count, up to the minimum bucket high value, when packets are sent from its associated queue;
periodically remove a number of tokens from the minimum bucket count, down to the minimum bucket empty value, the number of tokens being equal to a minimum refresh count for its associated queue; and
compare the minimum bucket count to the minimum bucket threshold.

7. The network device according to claim 1, wherein each of the maximum threshold bucket modules is configured to:
add tokens to the maximum bucket count, up to the maximum bucket threshold, when packets are sent from its associated queue;
periodically remove a number of tokens from the maximum bucket count, the number of tokens being equal to a maximum refresh count for its associated queue; and
compare the maximum bucket count to the maximum bucket threshold.

8. The network device according to claim 1, wherein:
each of the minimum threshold bucket modules is configured to:
add tokens to the minimum bucket count, up to the minimum bucket high value, when packets are sent from its associated queue;
periodically remove a number of tokens from the minimum bucket count, down to the minimum bucket empty value, the number of tokens being equal to a minimum refresh count for its associated queue; and
compare the minimum bucket count to the minimum bucket threshold; and
each of the maximum threshold bucket modules is configured to:
add tokens to the maximum bucket count, up to the maximum bucket threshold, when packets are sent from its associated queue;
periodically remove a number of tokens from the maximum bucket count, the number of tokens being equal to a maximum refresh count for its associated queue; and
compare the maximum bucket count to the maximum bucket threshold.

9. The network device of claim 1, wherein the metering modules are further configured to limit a rate at which an associated egress port sends the packets from the scheduler out of the network device.

10. The network device according to claim 1, wherein:
the queues are associated with different classes of service; and
the switch is configured to use maximum bandwidth shaping to limit bandwidth allocated to a queue associated with a specific class of service.

11. The network device of claim 10, wherein the scheduler is configured to enter a deficit round robin (DRR) mode, the DRR mode including:
the minimum threshold bucket modules allowing the minimum bucket count to drop below the minimum bucket empty value of the minimum threshold bucket module; and
the minimum threshold bucket modules for which the minimum bucket count dropped below the minimum bucket empty value subsequently receiving fewer credits added to their respective minimum bucket counts based on their minimum bucket counts dropping below their minimum bucket empty values.

12. The network device of claim 1, wherein the scheduler is configured to enter a deficit round robin (DRR) mode, the DRR mode including:
the minimum threshold bucket modules allowing the minimum bucket count to drop below the minimum bucket empty value of the minimum threshold bucket module; and
the minimum threshold bucket modules for which the minimum bucket count dropped below the minimum bucket empty value subsequently receiving fewer credits added to their respective minimum bucket counts based on their minimum bucket counts dropping below their minimum bucket empty values.

13. The network device of claim 1, wherein:

the minimum threshold bucket is configured to update the minimum bucket count in response to the network device receiving a packet based on comparing a time of receiving the packet to a timestamp of a previously received packet; and the maximum threshold bucket is configured to update the maximum bucket count in response to the network device receiving the packet based on comparing the time of receiving the packet to the timestamp of the previously received packet.

14. The network device of claim 1, further comprising a maximum rate metering module configured to compare a flow rate of a sum of all of the queues to a maximum bandwidth.

15. The network device of claim 14, wherein the maximum rate metering module is further configured to mark packets sent by the switch as in profile or out of profile based on the comparison of the flow rate to the maximum bandwidth.

16. A method for scheduling packets in a plurality of queues, the method comprising:

configuring a plurality of metering modules, each of the metering modules being associated with a queue and comprising:

a minimum threshold bucket module configured to indicate to the metering module whether a minimum bucket threshold is met based on comparing a minimum bucket count of the packets received by the associated queue to the minimum bucket threshold, the minimum bucket threshold being less than a minimum bucket high value and greater than a minimum bucket empty value for the minimum threshold bucket, the minimum bucket high value associated with the given queue determining a maximum burst size for the associate queue; and a maximum threshold bucket module configured to indicate to the metering module whether a maximum bucket threshold is met based on comparing a maximum bucket count of the packets received by the associated queue to the maximum bucket threshold; and allocating bandwidth for each of the plurality of queues first to the queues which are associated with metering modules for which the minimum bucket threshold is not met, second to the queues which are associated with metering modules for which the minimum bucket threshold is met and the maximum bucket threshold is not met, and to not service queues which are associated with metering modules for which both the minimum bucket threshold is met and the maximum bucket threshold is met.

17. The method according to claim 16, further comprising accepting, in at least one of the plurality of minimum threshold or maximum threshold bucket modules, a number of tokens in proportion to a size of a packet being added to its associated queue.

18. The method according to claim 16, further comprising using, by at least one of the plurality of bucket modules, a predefined bandwidth to determine how many tokens to release at predetermined time intervals.

19. The method of claim 16, further comprising:

comparing a flow rate of a sum of all of the queues to a maximum bandwidth; and marking packets as in profile or out of profile based on the comparison of the flow rate to the maximum bandwidth.

20. A network device for processing network data comprising:

configuring means for configuring a plurality of metering modules, each of the metering modules being associated with a queue and comprising:

a minimum threshold bucket module configured to indicate to the metering module whether a minimum bucket threshold is met based on comparing a minimum bucket count of the packets received by the associated queue to the minimum bucket threshold, the minimum bucket threshold being less than a minimum bucket high value and greater than a minimum bucket empty value for the minimum threshold bucket, the minimum bucket high value associated with the given queue determining a maximum size burst for the associated queue; and maximum threshold bucket module configured to indicate to the metering module whether a maximum bucket threshold is met based on comparing a maximum bucket count of the packets received by the associated queue to the maximum bucket threshold; and allocating means for allocating bandwidth for each of the plurality of queues first to the queues which are associated with metering modules for which the minimum bucket threshold is not met, second to the queues which are associated with metering modules for which the minimum bucket threshold is met and the maximum bucket threshold is not met, and to not service queues which are associated with metering modules for which both the minimum bucket threshold is met and the maximum bucket threshold is met.

* * * * *

UNITED STATES PATENT AND TRADEMARK OFFICE
CERTIFICATE OF CORRECTION

PATENT NO. : 8,320,240 B2  
APPLICATION NO. : 11/272131  
DATED : November 27, 2012  
INVENTOR(S) : Bruce H. Kwan et al.

Page 1 of 1

It is certified that error appears in the above-identified patent and that said Letters Patent is hereby corrected as shown below:

In column 16, line 34, In Claim 20, before "maximum" insert -- a --.

Signed and Sealed this  
Fifth Day of March, 2013

Teresa Stanek Rea  
*Acting Director of the United States Patent and Trademark Office*